US008281041B2

(12) United States Patent
Butterfield

(10) Patent No.: US 8,281,041 B2
(45) Date of Patent: Oct. 2, 2012

(54) SYSTEM AND METHOD FOR PREVENTING KEYPAD ENTRY ERRORS

(75) Inventor: Robert D. Butterfield, Poway, CA (US)

(73) Assignee: CareFusion 303, Inc., San Diego, CA (US)

( * ) Notice: Subject to any disclaimer, the term of this patent is extended or adjusted under 35 U.S.C. 154(b) by 1568 days.

(21) Appl. No.: 11/562,945

(22) Filed: Nov. 22, 2006

(65) Prior Publication Data

US 2008/0120437 A1     May 22, 2008

(51) Int. Cl.
*G06F 3/00* (2006.01)
(52) U.S. Cl. ............................ 710/5; 714/799; 714/813
(58) Field of Classification Search ....................... 710/5
See application file for complete search history.

(56) References Cited

U.S. PATENT DOCUMENTS

| 3,761,918 | A * | 9/1973 | Hatano et al. ................... 341/24 |
| 6,957,174 | B2 | 10/2005 | Wall |
| 7,015,896 | B2 | 3/2006 | Levy et al. |
| 7,382,359 | B2 * | 6/2008 | Griffin .......................... 345/169 |
| 2002/0123945 | A1 * | 9/2002 | Booth et al. ..................... 705/30 |
| 2005/0177797 | A1 * | 8/2005 | Yajima et al. .................. 715/781 |
| 2005/0283729 | A1 * | 12/2005 | Morris et al. ................. 715/720 |
| 2006/0139312 | A1 * | 6/2006 | Sinclair et al. ................. 345/156 |
| 2006/0187089 | A1 * | 8/2006 | Tolonen et al. .................. 341/22 |
| 2007/0234056 | A1 * | 10/2007 | Mani et al. ..................... 713/172 |

OTHER PUBLICATIONS

Windows XP: The Complete Reference: Accessibility Options, "Making the Keyboard More Accessible", retrieved from <http://delltech.150m.com/XP/access/3.htm>, printed on Dec. 1, 2011, Chapter 16.

* cited by examiner

*Primary Examiner* — Elias Mamo
(74) *Attorney, Agent, or Firm* — McDermott Will & Emery LLP

(57) ABSTRACT

A system and method for processing keystrokes made while operating a medical device to prevent keypad entry errors. The key press-to-press time is monitored and a subsequent key press rejected if the actual key press-to-press time is shorter than a key press-to-press limit. The actual key inactive time between the release of a key and the subsequent press of a key is compared to an inactive time limit. The subsequent key press is rejected if the actual inactive time is shorter than the inactive time limit. Alerts are provided and further key presses are ignored until the operator presses a CLEAR key. The active time of a key press is monitored and compared to an active time limit. If the actual key press active time exceeds the key press active time limit, an alert is provided but the key press is recognized. An adaptive approach is disclosed in which key presses of an operator are monitored and timing limits modified in accordance with the keying patterns of that operator.

35 Claims, 11 Drawing Sheets

SYSTEM AND METHOD FOR PREVENTING KEYPAD ENTRY ERRORS

FIELD OF THE INVENTION

The invention relates generally to the entry of data with a keypad, and more particularly, to a system and method for monitoring keypad data entry patterns to detect keypad entry errors.

BACKGROUND OF THE INVENTION

Unintended data entries from a keyboard or keypad are known to occur due to a variety of reasons, such as electromagnetic interference (EMI), noisy or corroded button contacts, mechanical key bouncing, and human error. Because of one or more of the foregoing problems, a person may intend to press a key once but upon pressing the key, two or more key presses are registered, resulting in a data entry error. As an example, if an operator presses the key marked "4" once, a key bounce error may register a "44" instead of the intended "4." This is an eleven-fold error. The person may correct the data entry error if he or she becomes aware of the error, such as by being alerted with a display screen, an audible alert signal, or otherwise. Notification and prevention of unintended data entries are especially important in a medical setting, such as when a clinician is entering drug delivery parameters into an infusion pump. However, the presence of such data entry errors and the need to correct them adversely affect work flow efficiency. It is preferable to prevent such errors from occurring in the first instance.

As used herein "keypad" is meant in a general sense and encompasses devices referred to as keyboards, keypads, touch screens, and other data entry devices using discrete, virtual, or other types of keys to enter data. Keypad, keyboard, key, switch, or contact "bounce" is used herein to mean the mechanical rebounding of an electrical contact of a key or switch that occurs before the electrical contact settles to a closed or an open state. "Refractory time" is used herein to mean the time after the previous key press during which another key press will be ignored or rejected.

Unintended numeric entries may be reduced by using a mechanical configuration of a keypad that is less prone to key bounce and by using electronic filters. Additionally, the use of dome or other mechanical switch structures provides beneficial mechanical hysteresis, making it more difficult to unintentionally make duplicate key presses. These designs, while effective, may be more costly, prone to wear or difficult to manufacture compared to other designs. Microprocessor software may also be used to filter out unintended numeric entries by implementing key press "debounce" algorithms or programs that require key presses to satisfy predetermined criteria before they are accepted. For example, a microprocessor may ignore a key press if it has not been pressed down and held "active" for a minimum amount of time. Increasing the amount of time a key must be held active increases confidence that the person intended to press the key, but may also decrease workflow efficiency by inhibiting desired or intentional data entries. Also, if the required active time is too long, a person might unintentionally release the key too soon and an intended data entry will be ignored, thereby creating a new source of data entry error.

Other key press debounce program designs impose a single "refractory time" requirement, e.g. a minimum number of seconds of inactive time between keystrokes. When such a requirement is invoked, the processor will ignore any keystrokes occurring "too soon" after a previously accepted keystroke. Such an approach is used to avoid bounce, but if the length of required inactive time is too long, the speed of data entry can be adversely affected. Data entry personnel who are much faster at entering data on a keypad can be frustrated by a long refractory time, or inactive time, requirements. An inactive time length that satisfies both of the requirements of rapid data entry and prevention of keystroke error due to abnormal key strokes is desirable. While this approach is helpful in reducing data entry errors, it does not detect all abnormal stroking patterns.

As an example, in one key press debounce program design, recognition of a keystroke requires that there be a minimum of twenty milliseconds ("milliseconds") of inactive key time (key not pressed) followed by twenty milliseconds of active key time (key pressed). This design permits keying at a rate of up to twenty-five keystrokes per second. However, experiments with experienced users indicated that about eight keystrokes per second is the practical upper keying rate with the particular keypad used in the experiments. Allowing more rapid entry, as was possible in this design where only a twenty-millisecond interval and twenty-millisecond press time were required, posed the potential for unintended repeated key press actions being registered. To overcome this potential problem, an algorithm change could be made.

Hence, those skilled in the art have recognized a need for a system and method of monitoring keypad presses to detect and prevent data entry errors while allowing for rapid and efficient data entry.

SUMMARY OF THE INVENTION

Briefly and in general terms, the present invention is directed to a system and method for detecting and preventing key press errors on a keypad, which may arise due to certain pressing motions and patterns and which may result in unintended duplication of keystrokes.

In one aspect in accordance with the invention, there is provided a method for preventing keypad entry errors, the method comprising detecting a press and a release of a first key of a keypad having a plurality of keys, the time between the press and the release being an actual first key active time, detecting a time of a first subsequent key press on the keypad to the first key press, determining an actual key press-to-press length of time between the first key press and the first subsequent key press, comparing the actual key press-to-press length of time to a key press-to-press time limit and if the actual key press-to-press time is shorter than the key press-to-press time limit, rejecting the first subsequent key press, determining an actual inactive length of time between the release of the first key and the first subsequent key press, and comparing the actual inactive length of time to an inactive length of time limit and if the actual inactive length of time is shorter than the inactive length of time limit, rejecting the first subsequent key press.

In more detailed aspects, the method further comprises comparing the actual first key active time to an active time limit and providing an active time alert if the actual first key active time exceeds the active time limit. The active time alert may prompt the user to verify the keypad entry. The method further comprises recognizing the first key press regardless of the active time alert being provided. The method additionally comprises providing an alert if the first subsequent key press has been rejected due to the actual key press-to-press time being shorter than the key press-to-press time limit. The alert may prompt the user to verify the entry. In further aspects, the alert comprises a visual display warning of first subsequent key press rejection. The alert comprises an audible warning of first subsequent key press rejection. The method comprises ignoring further key presses until a specified key has been pressed. The specified key may be a "Clear" key.

In other detailed aspects, the method comprises providing an alert if the second key press has been rejected due to the actual key inactive time being shorter than the key inactive time limit. The method wherein the alert comprises a visual display warning of subsequent key press rejection. The method wherein the alert comprises an audible warning of subsequent key press rejection. The method further comprises ignoring further key presses until a specified key has been pressed. The method further comprises detecting the press and release of the subsequent key, the time between the press and release being the actual subsequent key active time, comparing the actual subsequent key active time to an active time limit, and providing an alert if the subsequent key press actual active time exceeds the active time limit.

In accordance with system aspects of the invention, there is provided a system for preventing keypad entry errors, the system comprising a keypad having a plurality of keys, a scanning device communicating with the keypad and configured to detect a time of a first key press, a time of a first key release, a time of a first subsequent key press on the keypad and a time of a first subsequent key release, a memory configured to store a key press-to-press limit, a key inactive limit, and a key active limit, and a processor in communication with the scanning device and the memory, the processor programmed to determine an actual key press-to-press length of time between the first key press and the subsequent key press, compare the actual key press-to-press time to the key press-to-press time limit retrieved from memory, reject the subsequent key press if the actual key press-to-press time is shorter than the key press-to-press time limit, determine an actual key inactive time between the release of the first key and the subsequent key press, compare the actual inactive time to the key inactive time limit retrieved from memory, reject the subsequent key press if the actual inactive time is shorter than the key inactive time limit, determine an actual key active time between the press of the first key and the release of the first key, compare the actual first key active time to the key active time limit retrieved from memory, and provide an alert if the first key actual active time is longer than the key active time limit.

In more detailed system aspects, the processor is further programmed to compare the actual first key active time to an active time limit, and provide an alert if the first key press actual active time exceeds the active time limit. The system further comprises recognizing the first key press if the first key press actual active time exceeds the active time limit. The processor is further programmed to provide an alert if the subsequent key press has been rejected due to the actual key press-to-press time being shorter than the key press-to-press time limit. The system further comprises a display device wherein the processor is further configured to provide a visual display warning of subsequent key press rejection on the display device. The system further comprises an audio output device wherein the processor is further configured to provide an audio warning of subsequent key press rejection on the audio output device.

In yet further detailed system aspects, the processor is further programmed to ignore further key presses until a specified key has been pressed if either the actual key press-to-press time is shorter than the key press-to-press time limit or the actual key inactive time is less than the key inactive time limit. The processor is further programmed to determine an actual subsequent key active time between the press of the subsequent key and the release of the subsequent key, compare the actual subsequent key active time to the key active time limit retrieved from memory, and provide an alert if the subsequent key actual active time is longer than the key active time limit.

In a further aspect in accordance with the invention, a plurality of key presses of the keypad are monitored, the monitored key presses are compared to at least one of the time limits, and modifying the time limit or limits to which the monitored key presses were compared based on results of the comparison.

The features and advantages of the invention will be more readily understood from the following detailed description which should be read in conjunction with the accompanying drawings.

DETAILED DESCRIPTION OF THE PREFERRED EMBODIMENTS

Figure 1:
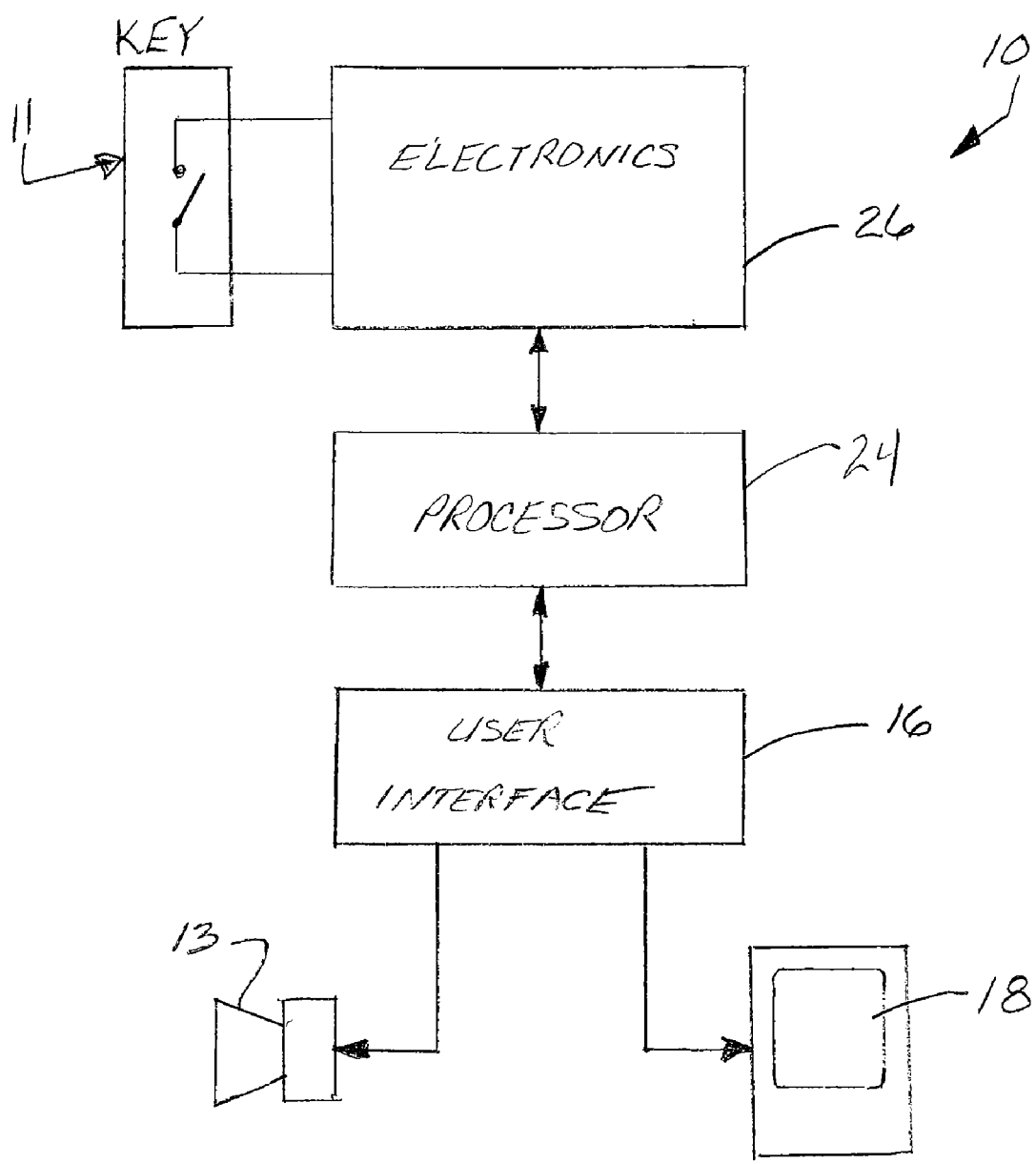
FIG. 1 is an overview block diagram of a generic keypad control system including a user interface presenting visual and audible information.
Figure 2:
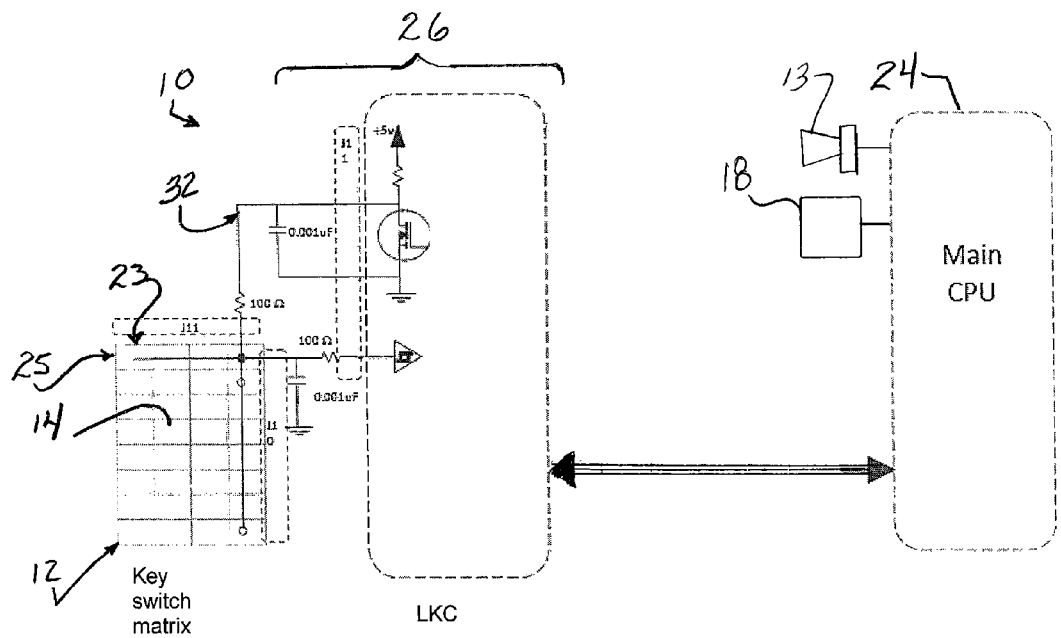
FIG. 2 is a more detailed diagram of a particular embodiment of a keypad control system showing a keypad matrix, some of the electronics for the keypad matrix, and a main CPU and a display.

Referring now in more detail to the exemplary drawings for purposes of illustrating embodiments of the invention, wherein like reference numerals designate corresponding or like elements among the several views, there is shown in FIGS. 1 and 2 a keypad control system 10 for controlling the entry of data though the use of a keypad. A key contact 11 is shown in FIG. 1 and a keypad 12 in FIG. 2 that is organized electrically in a five column by eight row key switch matrix 14. Each of the keys in the matrix of FIG. 2 will have an electrical switch such as that shown schematically in FIG. 1.

Figure 3:
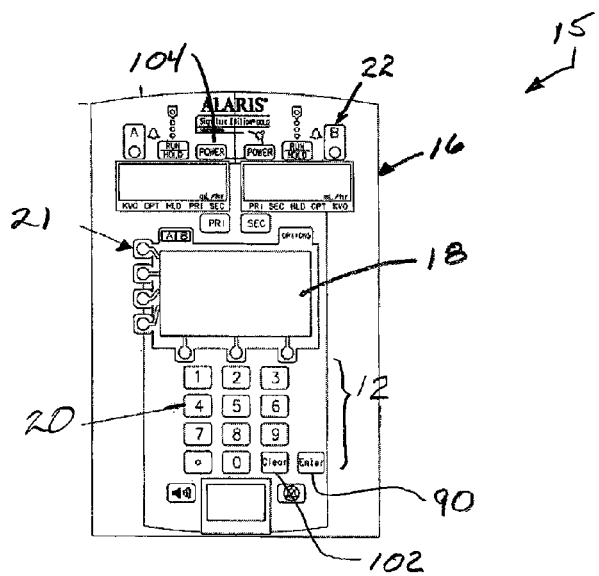
FIG. 3 is a front view of a control panel of an ALARIS Signature Edition® infusion pump showing a keypad, display screen, and a keypad having a plurality of numeric keys, navigational keys, and keys for selecting functions.

In one embodiment, the keypad 12 may form part of a control panel 16 of the Signature Edition® infusion pump 15 shown in FIG. 3 made by ALARIS Products of Cardinal Health, San Diego, Calif. The control panel 16 may be thought of as a user interface. However, it will be appreciated that the control panel may form part of other types of medical devices. The ALARIS Signature Edition pump platform key entry system consists of a number of momentary contact switches located on the instrument front panel 16. Dual channel (72xx) instruments (not shown) have additional keys for channel selection and operation. The control panel includes a display screen 18 and a plurality of dedicated numeric keys 20 (FIG. 2) for entering numbers, and in this embodiment, soft keys 21 for navigating through menus, and selecting functions. The display screen is adapted to display a visual alert as described in further detail below. The visual alert may prompt an operator who is making a keypad entry to verify the entry. In an embodiment, a CLEAR key must be pressed to proceed. The control panel also includes various light emitting diodes ("LEDs" or "LED") 22 for providing alerts and other information. As shown in FIGS. 1 and 2 but not in FIG. 3, a speaker 13 is used to provide certain audible information and may be used to provide feedback clicks indicating successful keyboard entries or alert tones indicating unacceptable keyboard entries.

Through commands initiated by a main central processing unit ("CPU") 24, each column of keys 23 is selected one at a time and the output of each row of keys 25 is read simultaneously in one embodiment. All keys are scanned every ten milliseconds with each scan requiring about six milliseconds, in one embodiment.

The keypad electronics 26 provides column selection, row selection, buffering, transmission of the received key data, and performs other functions. Each scan is initiated by the CPU 24 which issues the appropriate request to the keypad electronics. The resulting "keypad image" is transmitted in a data stream to the CPU where it is stored and processed. A schematic of selected discrete circuitry is shown in FIG. 1. That circuitry comprises part of the electronics 26. However, these components are shown for purposes for illustration only and do not comprise the entire electronics controlling the operation of the keypad. On request of the microcomputer 24, nominally once each ten milliseconds, all keys 14 of the keypad 12 are scanned. In other embodiments the time between scans is different than ten milliseconds. The resulting data is passed to the main CPU 24 where it is buffered and processed.

Keystrokes or key presses are recognized or rejected based on rules implemented in an underlying key press debounce program that resides in the main CPU 24. As previously mentioned, all keys are scanned once every selected period of time, such as ten milliseconds. In accordance with one aspect of a key press debounce program discussed above, the state of all keys of the entire keypad 12 must be unchanged for two successive scans in order for a key press to be recognized. That is, a state change from pressed to released or a state change from released to pressed must be followed by no state changes for at least two successive scans. For example, not only must a key press be detected in the first scan of ten milliseconds, but it must also be detected in the immediately subsequent second scan of ten milliseconds. If such criterion is met, a key press will be recognized. Accordingly, the fastest potential key entry rate is twenty-five key presses (strokes) per second or one key press (stroke) every forty milliseconds.

Figure 4:
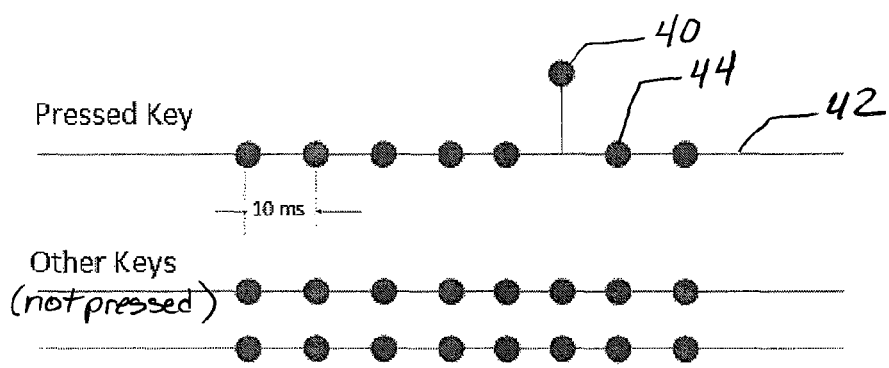
FIG. 4 is a timing diagram showing scans being taken every ten milliseconds to detect state changes on the keypad, and showing one key of the keypad having an active state for less than two scan periods while all other keys on the keypad have an inactive state.

FIG. 4 is a schematic diagram that shows a key press 40 that is invalidated because the key was not activated long enough. Keys states are shown by the position of dots and lines. In this case, the "Pressed Key," reading from left to right, shows the key in a released state for five scans of ten milliseconds per scan. For the sixth scan, the key is shown above the line meaning that it has been pressed or activated 40. The figure also shows "Other Keys" of the keypad and none are shown as being pressed; all are on their respective lines. In this case, the "Pressed Key" was pressed 40 such that a state change from a release state 42 to a pressed state 40 is followed in the immediately next scan by a state change from pressed 40 to released 44. Because the key 40 was not pressed long enough for two sequential scans, as required in this example embodiment, the underlying key press debounce program will reject it and will not recognize it as an intentional key press. No effect will then be given to the key press 40.

Figure 5:
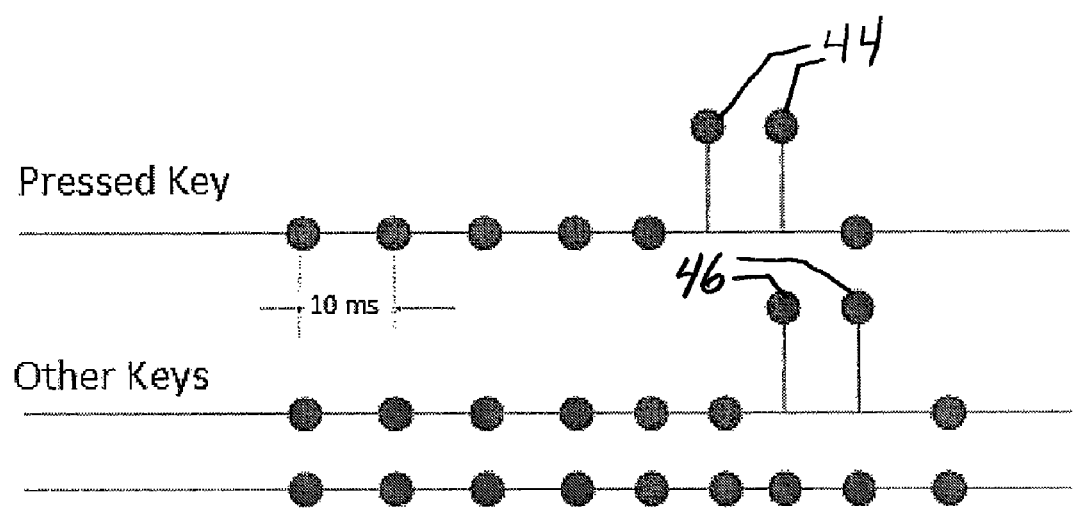
FIG. 5 is a timing diagram showing scans being taken every ten milliseconds to detect state changes on the keypad, and showing two keys on the keypad having an active state for two scan periods, the active states of the two keys starting and ending on different scan points.

FIG. 5 is another schematic-type drawing in which keys and key presses are represented by dots and lines, as in FIG. 4. In FIG. 5 on the "Pressed Key" line, a key has been pressed 44 and held in the pressed state for two sequential scans of ten milliseconds per scan. While this would qualify the key press 44 for recognition by the underlying key press debounce program, another key 46 has also been pressed as shown in the "Other Keys" line. These are presses 44 and 46 of two separate keys, such as for example, numeric key labeled "4" and numeric key labeled "5" from the keypad 20 of FIG. 3. Although each key press lasts for two successive scans, both key presses are rejected by the key press debounce program because a state change occurs in one key while the other key is being pressed. The key presses are rejected unless an inactive period or refractory period of twenty milliseconds exists between the last state change of a key and a new state change of a key. Thus in the example of FIG. 5, the key press of 46 does not occur twenty milliseconds after key 44 has been released but instead actually overlaps the active state of key 44. The key press debounce program thus rejects both key presses of 44 and 46. Such a situation could possibly arise where the operator inadvertently presses a second key when trying to press a single key.

For ease of discussion herein, the key press 44 shown in FIG. 5 may be referred to as a first key press. The word "first" is used in a relative sense to the order of the described keys and not to indicate that it is the first key ever pressed on the keypad. Releasing the first key, after the second raised dot 44, may be referred to as releasing the first key. Pressing the next key 46 shown in FIG. 5 may be referred to as the first subsequent key press in which the word "first" refers to the subsequent key 46 being the immediately next or "first" key pressed after, or subsequently, to the first key 44.

Figure 6:
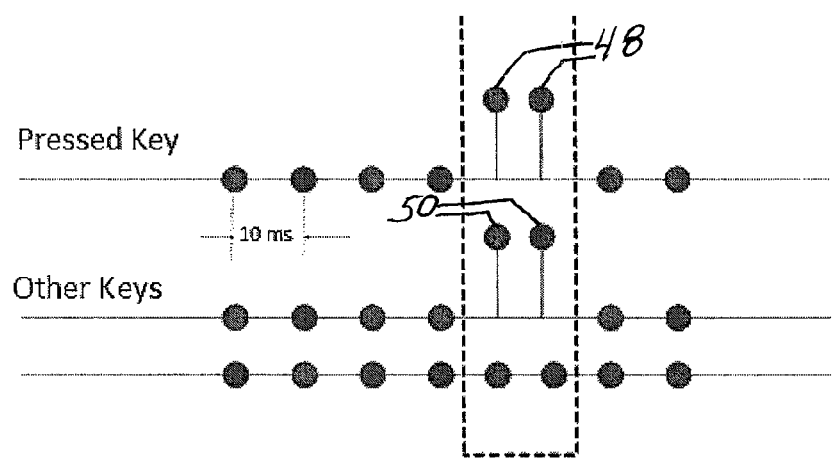
FIG. 6 is a timing diagram showing scans being taken every ten milliseconds to detect state changes on the keypad, and showing two keys on the keypad having an active state for two scan periods, the active states of the two keys starting and ending on the same scans points.

FIG. 6 presents the example where key presses entirely overlap each other; a situation that may arise when an operator attempts to press a single key but his or her finger actually presses two keys. The two separate key presses 48 and 50, such as for example, numeric key "1" and numeric key "2" from the keypad 20 of FIG. 2, each have been pressed (as indicated by being above their respective lines) and held for two scans (twenty milliseconds). Although each key press lasts for two successive scans as required by one part of a key press debounce algorithm, both key presses are invalidated and rejected because the state changes for both keys from "pressed" to "released" occurred simultaneously, that is, during the same scans; there was no inactive key press period.

Other rules may have been implemented by a key press debounce program to detect and reject simultaneous (concurrent) key presses and for stuck keys (pressed for more than nine seconds for example). Additionally, the CPU 24 may provide an instruction to emit an audible alert such as an "invalid key" tone so as to notify the person entering data that certain key presses were rejected. A visual warning or warnings may also be provided, such as on the display 18 of the infusion pump shown in FIG. 2. Various visual messages may be given such as "KEY PRESS NOT ENTERED."

Furthermore, field-specific rules may also be implemented by an underlying key press debounce program to detect and audibly warn if the maximum number of digits has been entered for a particular field. Similarly an audible warning can be produced if an inactive soft key 21 is pressed (FIG. 2). Soft keys are keys that change function. The function of a soft key is typically shown on a portion of the display screen immediately adjacent the soft key. During some operating modes of an infusion pump or other device, a soft key may be inactive and have no function in which case, if the inactive soft key is pressed, an audible warning is preferably produced. A visual warning or warnings may also be given.

In accordance with aspects of the system and method of the present invention, a key press that has initially been deemed valid and recognized by an underlying key press debounce program may later be continued to be recognized or may be rejected. To make this determination, additional rules are implemented. In one aspect of the present invention, the key press system and method tests three elements of each key press. In a first element, the system and method determine whether the key has been pressed and held in the active state for too long. The time duration of the key press is sensed and compared to an active state duration limit or threshold. If the duration of the key press exceeds the limit, an alert is provided to the operator, although the key press continues to be recognized. In a second element, the key press system and method determine whether the time from one key press to the next has been too short. This may be thought of as the key press-to-press duration threshold. For the third element, the key press system and method determine whether the duration between the release of a key and the press of the next key (which may be the same key) is sufficiently long. This may be considered to be an inactive state duration threshold. Preferably, thresholds or rules for these properties are implemented by the key press system and method in accordance with the invention. A program implementing the system and method of the invention may reside within the main CPU 24.

The above-described rules may differ depending on whether a pressed key is numeric (including the decimal point) or non-numeric, such as a control or navigation key. As will be explained below, the accept-reject thresholds or limits for these measurements were selected in the embodiment described to optimize the accuracy of detecting true double-key entry error events while maximizing the recognition of normal and accurate keystrokes. In this way, intended keystrokes are not unduly rejected.

Figure 7:
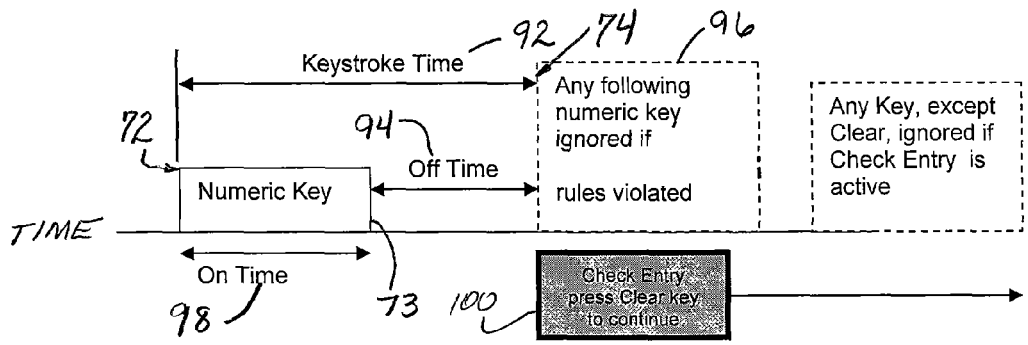
FIG. 7 is a diagram showing a numeric key press followed by a possible numeric key press or non-numeric key press, and showing time periods that define an active or ON time, inactive or OFF time, and a keystroke time, and further showing when a warning message may be displayed.

Now referring to FIG. 7, in accordance with the first element of an aspect of the system and method of the invention, the active time period or "on time" 98 is the time during which a key is pressed 72 and continuously held pressed (the release of the key is indicated by numeral 73). In addition to a lower limit, e.g., ten milliseconds as discussed above to have a key press recognized as intentional, it is also desirable to limit the active time period to an upper limit because it has been found that there is risk of unintended keystrokes occurring if a key is pressed for too long. In particular, it has been found that when a key is pressed for an unnecessarily long period of time, there is a risk that an unintended brief release and re-press will cause an unintended double-key entry. Preferably, the active time period does not exceed 270 milliseconds in one embodiment. In accordance with this aspect of the invention, an alert will be provided to the operator in the case where a key press that is initially recognized by a key press debounce program is kept active for a time period that exceeds 270 milliseconds. A visual alert, such as a pop up screen on a display, will be provided in one embodiment. Other alerts may be provided in other embodiments. It has been found that a time period of 270 milliseconds is much longer than an operator normally presses a key, although other time periods may be selected as the active time period limit.

In a second element of the key press system and method according to an aspect of the invention, the key press-to-press time period 92 is the period of time from the first recognized key press 72 to the next 74. This period is also referred to herein as the "key press-to-press period" or the "stroke-to-stroke period." Preferably in one embodiment, the key press-to-press period must be at least 150 milliseconds long or the second key press will be rejected and an audible alert given. That is, if a second recognized press of the same key occurs after a first recognized press of that key and that second press occurs within 150 milliseconds of the first press, that second key press will be rejected. An audible alert will be given, such as a "boop" tone or other dual tone, and a visual pop-up box is provided on the display. In one embodiment, further key presses are ignored until a "CLEAR" key is pressed. The CLEAR key will clear the pop up box and allow further key entries. This 150 millisecond limit or threshold was selected based on tests given to a number of clinicians.

In another embodiment relating to this second element, the second recognized key press is rejected as described above and after the required press-to-press period has expired, key presses may again be made without having to press a CLEAR key. In a further embodiment, this key press-to-press period applies to the same key as well as to presses of different keys.

The third element concerns an inactive time period or "off time" 94 defined as the time in which no key is being pressed immediately prior to a key press 74. This includes either the same key or any other key on the keypad. In one embodiment the inactive time period is no shorter than sixty milliseconds. That is, a key press will be rejected if less than sixty milliseconds have passed since a previous key press has been released. It has been found that an inactive time period of less than sixty milliseconds is associated with erroneous or accidental entries. Under this element or rule, the first key press 72 may be recognized; however if after releasing the first key press 73, the second key press 74 occurs in less than sixty milliseconds from that release. If such occurs, the system and method in accordance with aspects of the invention will reject the second key press 74, provide an audible alert such as a "boop" tone or other, and provide a visual alert, such as a pop up window warning or other.

The above-discussed limits were selected based on extensive measurements and statistical modeling of the keying patterns derived from over 70,000 keystrokes on the keypad of an ALARIS Signature Edition drug infusion pump. The keypad on that pump is generally described as a membrane type. It will be appreciated that other limits may be used for other types of keypads. In other embodiments, it would be possible to vary one of the three acceptance criterion as a function of the other. Specifically the stroke-to-stroke limit may be made a function of either the actual active time of the previous key press or the actual inactive time immediately preceding the current press. These approaches were shown to increase the rate of detection of deliberate attempts to cause double-key events in the laboratory.

It will be appreciated that the three-element key press algorithm described above functions first to modify behavior of the operator through providing feedback that an error-prone keying pattern is being used. This may encourage the operator to stabilize the pump to avoid shaking and vibration during entry and to avoid excessively long or short key presses. Secondly, it functions to identify and block any abnormal key presses providing the operator with feedback and an opportunity to correct the potentially erroneous key actions. The algorithm functions for non-numeric keys as well helping to avoid inadvertent selection of drug, function, or similar navigational error.

The three element key press algorithm may be used to provide a three-dimensional criterion based on an active limit, inactive limit, and stroke-to-stroke limit. The algorithm may also be used to provide a two-dimensional criterion based on an active limit and a stroke-to-stroke limit, as discussed below in connection with FIGS. 17 and 18 as discussed below. The algorithm may also be used to provide a two-dimensional criterion based on an inactive limit and a stroke-to-stroke limit, as discussed below in connection with FIGS. 19 and 20.

In yet other embodiments, statistics are computed over multiple key presses at the time an Enter key 90 on the keypad 12 (FIG. 2) is pressed following the entry of two or more keys in a numeric edit field. This concept would apply measurement of the active, inactive, and stroke-to-stroke times of all key presses made while entering a field. Acceptance criteria could include the ratio of the shortest to the average, shortest to longest and so forth, the objective being to compare the worst case to the typical key pattern and detect a key pattern which was atypical for that user.

For numeric keys while in the numeric editing mode, a popup "Check Entry" alert message on a display screen and accompanying two-tone sound such as a "boop" tone are preferably produced if any of the three rules have been violated. This popup alternates with the normal display permitting observation of the digits entered. If the device is not in edit mode, the popup will not occur and an invalid key tone is produced when either the stroke-to-stroke period or off time rules have been violated, but not the excess on time rule.

As shown in FIG. 7, if the time minimum of either the stroke-to-stroke time period 92 or inactive time period 94 is not met during an entry into a numeric field, the most recent key pressed will be ignored 96 and not shown on the display screen 18 (FIG. 2), and the "Check Entry" message 100 is shown on the display screen. Preferably, while the "Check Entry" message is shown, no further presses except presses of the "CLEAR" 102 and "POWER" 104 keys are recognized and the invalid key tone is produced. The "Check Entry" message must be deliberately canceled by pressing the "Clear" key. If the limit for the active time (on time) period 98 is exceeded when a numeric value is being entered, the "Check Entry" message 100 is shown on the display screen, the key press is recognized, and the corresponding numeric value is also shown on the display screen.

Preferably, for non-numeric keys, violation of the stroke-to-stroke limit or inactive limit causes the invalid key tone to be produced and the most recent key pressed will be ignored. A visual message may also be displayed in another embodiment. Preferably, for non-numeric keys, a check against the active limit is not performed since navigation keys are often pressed in rapid succession and/or a change in the screen display signals the result of a recognized key press.

Figure 8:
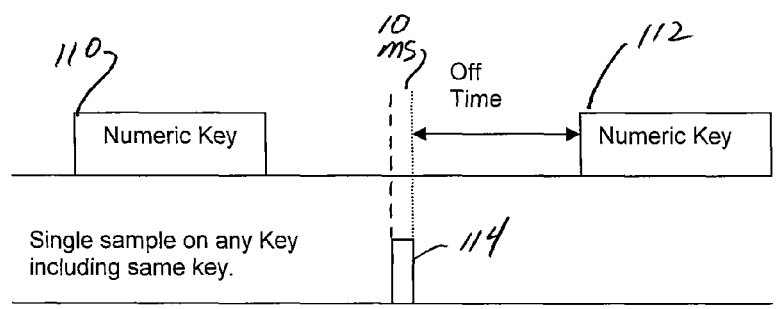
FIG. 8 is a diagram showing a numeric key press followed by another numeric key press, a scan or sample occurring between the two key presses, and further showing a time period that defines an inactive or OFF time.

FIG. 8 shows a first key press 110 of a numeric key followed by a second key press 112 of the same key. As previously mentioned, the inactive time limit requires that no key activity occur in the minimum time preceding a valid key press. In the rare case that a single ten milliseconds sample 114 intervenes following a numeric press 110, the sample 114 will not be recognized as a valid key press by the debounce program but will cause the release time (off time) count to reset in one embodiment.

Figure 9:
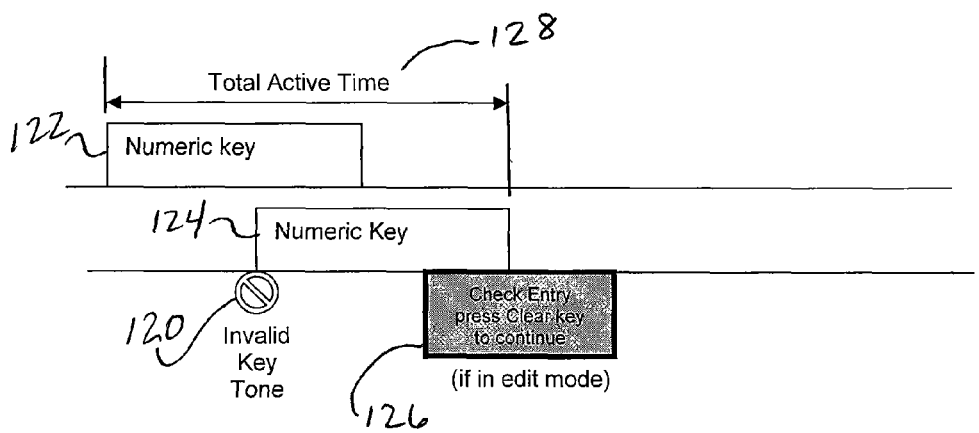
FIG. 9 is a diagram showing a numeric key press of a first key overlapping with a numeric key press of second key, a time period that defines a total active or ON time, and further showing when an invalid key tone and when a warning message may be produced.

Referring to FIG. 9, an "Invalid Key press" tone 120 is preferably produced when two 122 and 124 or more key presses overlap. Additionally, overlapping key presses of numeric keys preferably cause a "Check Entry" message 126 to be shown as a pop up on the display screen if the combined key presses amount to an active time period 128 that exceeds the active limit of 270 milliseconds. The active time period is measured from the onset of the first numeric key pressed until the second numeric key is released. If this time exceeds the allowed maximum while in edit mode, a popup visual message is produced, if not in edit mode only an invalid key tone is produced.

Figure 10:
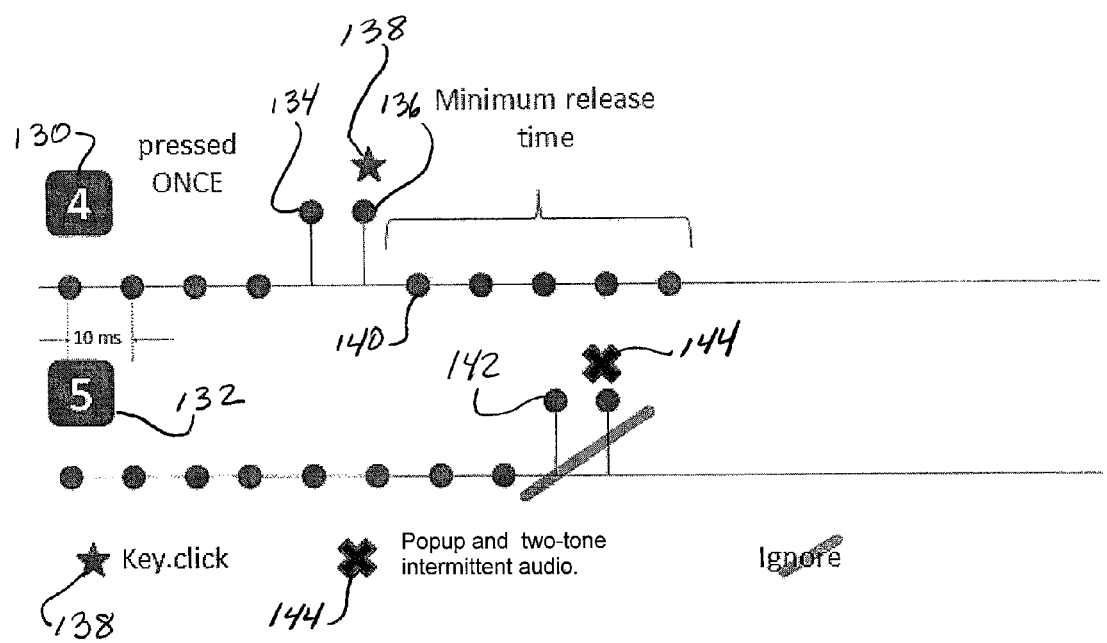
FIG. 10 is a timing diagram showing scans being taken every ten milliseconds to detect state changes on the keypad, showing a four-key and five-key on the keypad being pressed and held active for two scan periods, showing a criterion for inactive time following the four-key active period, and showing the five-key press being ignored for violating the criterion for inactive time.

FIG. 10 shows the numeric key labeled "4" (the "four" key) 130 and the numeric key labeled "5" (the "five" key) 132 being pressed on the keypad. At point 134 the pressing of the "four" key is detected by a scan. At point 136, a subsequent ten millisecond scan detects that the "four" key remained pressed. At this point, the key press debounce algorithm recognizes the key press because the entire keypad was unchanged for two successive scans. Also, an audible feedback key click 138 is produced to indicate to the operator that the key press was accepted because the active time was less than the active limit of 270 milliseconds. It is to be understood that the keypad was inactive for at least sixty milliseconds prior to point 134. At point 140, release of the "four" key is detected. At point 142, the pressing of the "five" key is detected by a scan, but is rejected or ignored by the key debounce algorithm because the "five" key was pressed in less than sixty milliseconds after the "four" key was released. In this case, it was pressed only twenty milliseconds. Instead of an audible feedback key click, a two-tone audio error tone 144 such as a "boop" tone is produced and a visual error message is shown to notify the operator that the key press at point 142 was ignored.

Figure 11:
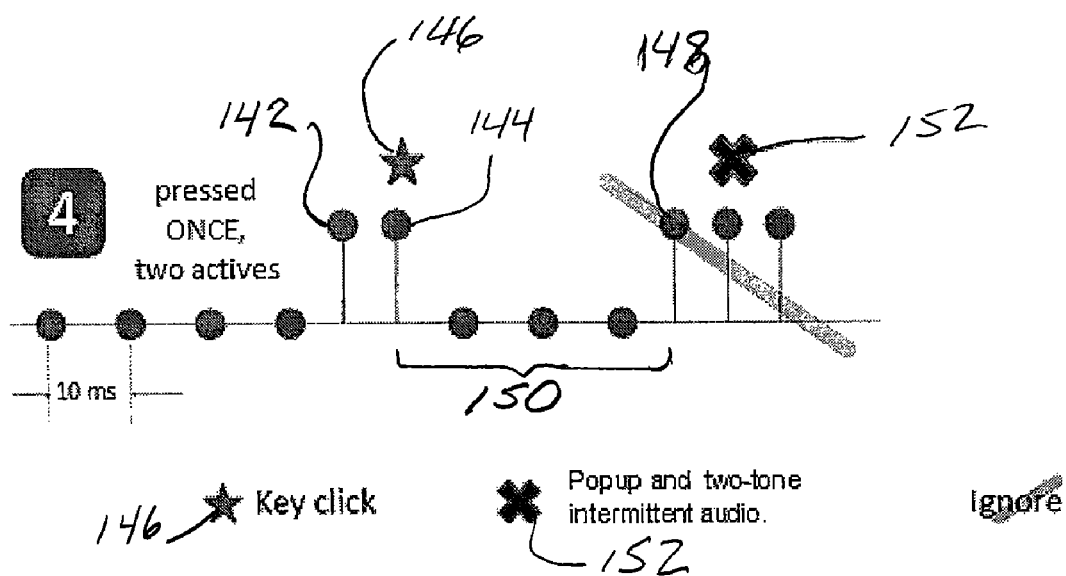
FIG. 11 is a timing diagram showing scans being taken every ten milliseconds to detect state changes on the keypad, showing the four-key being pressed and held active for two scan periods, showing the four-key being pressed and held active for three scan periods, the second key press being ignored for violating a criterion for inactive time.

Referring now to FIG. 11, pressing 142 the "four" key is detected by a scan. At point 144, a subsequent ten milliseconds scan detects that the "four" key remained pressed. At this point, the key press debounce algorithm recognizes the key press because the entire keypad was unchanged for two successive scans. Also, an audible feedback key click 146 is produced to indicate that the key press was recognized because the active time was less than the active limit of 270 milliseconds. It is to be understood that the keypad was inactive for at least sixty milliseconds prior to point 142. At point 148, a repeat pressing of the "four" key is detected. The second key press 148 is ignored by the debounce algorithm because the inactive time period between key presses was less than sixty milliseconds (each space in FIG. 11 is representative of only 10 milliseconds). Instead of an audible feedback key click, a two-tone audible alert 152 is produced and an error message is shown to notify the operator that the key press at point 148 was ignored. A visual alert may also be given, such as a popup screen.

Figure 12:
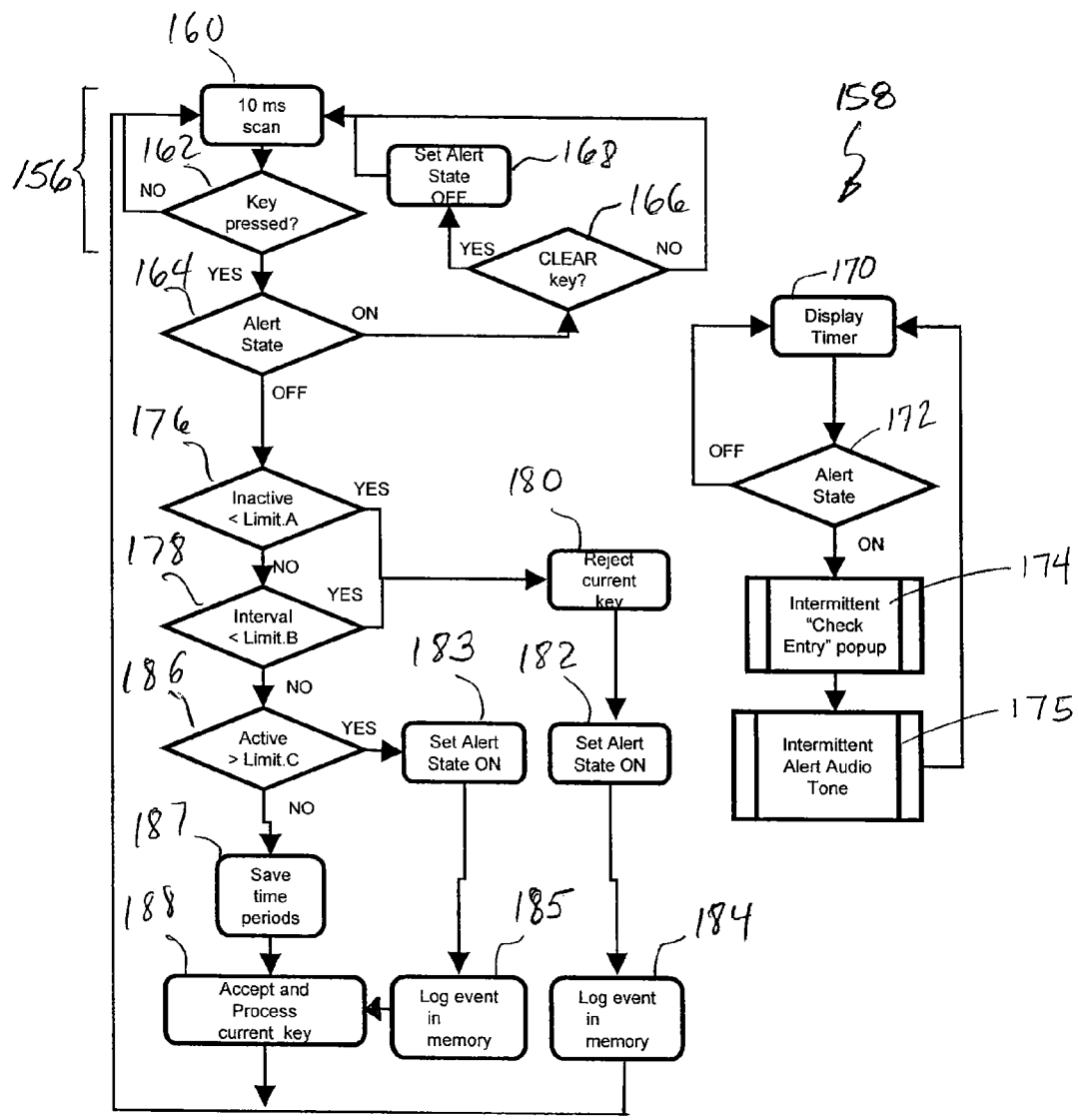
FIG. 12 is a flow chart of a method in accordance with aspects of the invention.

Referring now to FIG. 12, a flow chart embodiment of a key press method in accordance with aspects of the invention is provided. In this embodiment, a key scan loop 156, shown on the left side of FIG. 12, runs concurrently with a display update loop 158, shown on the right side of FIG. 12. As part of the key scan loop, the keys are scanned every ten milliseconds 160 in this embodiment. If a key press is not detected 162, the method returns to scanning all keys 160. If a key press is detected, the method determines whether the alert state is ON or OFF 164. When the alert state is ON, the method determines whether the CLEAR key is pressed 166. The alert state is set to OFF 168 when the CLEAR key is pressed. If the CLEAR key is not pressed 166, the ten-millisecond scan of keys 160 resumes.

As part of the display update loop 158, a display timer 170 periodically checks whether the alert state is ON or OFF 172. When the alert state is ON, the method displays in this embodiment a "CHECK ENTRY" popup visual alert 172 and generates an intermittent audio alert 175. The CHECK ENTRY popup visual alert prompts an operator who is making a keypad entry to press the CLEAR key and, thus, verify the keypad entry that resulted in the alert state being set to ON. The popup visual alert in this embodiment is intermittent, meaning the popup visual alert flashes on and off from the display 18, to allow the operator to see any information behind the popup visual alert. As used above, the designation "popup" is meant to refer to a graphic window that appears on a display over an existing graphic window. However, other visual alerts may be used.

Figure 13:
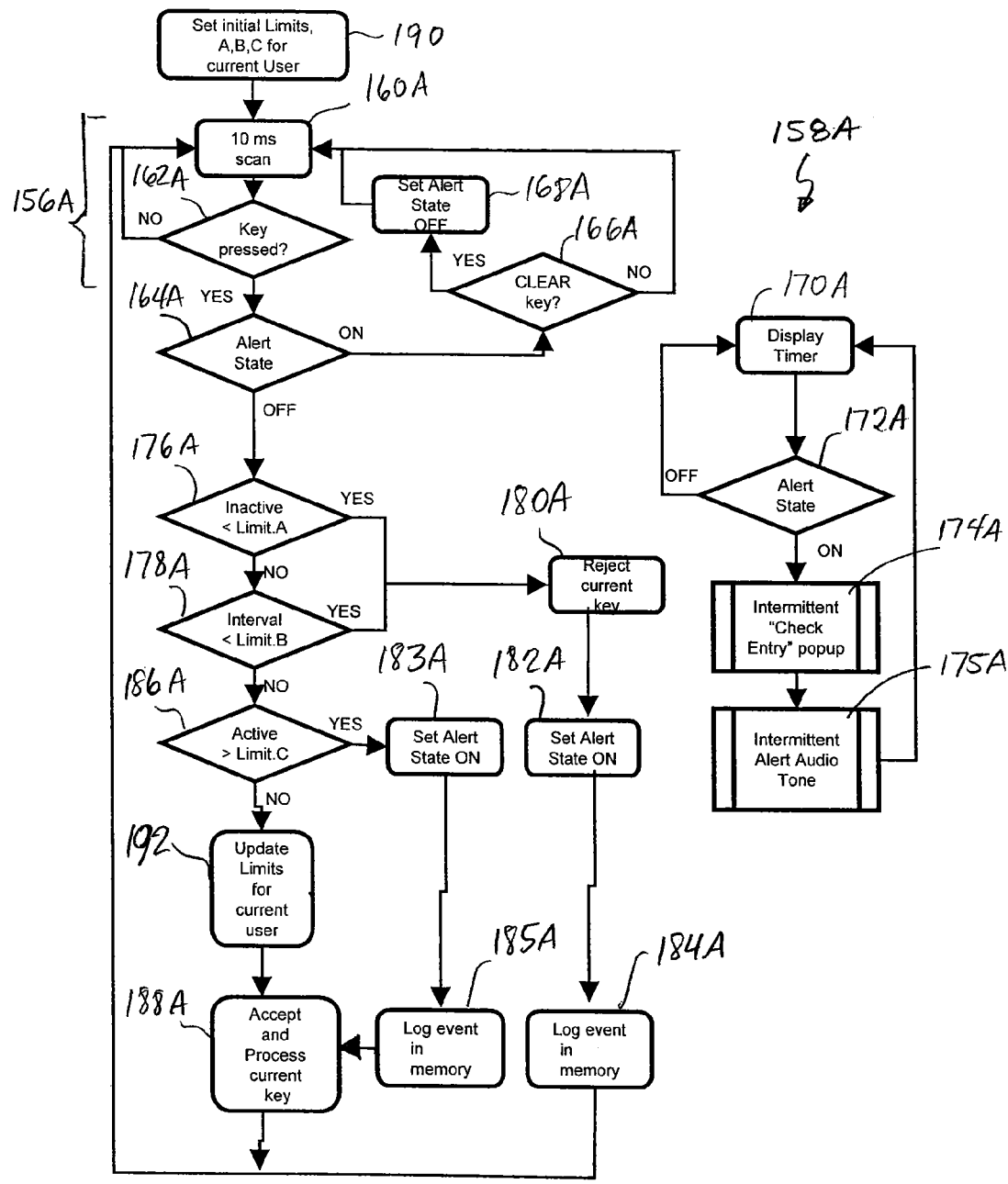
FIG. 13 is a flow chart of an adaptive, operator-specific, method for preventing keyboard errors in accordance with aspects of the invention in which time limits are modified based on specific operator keying characteristics.
Figure 14:
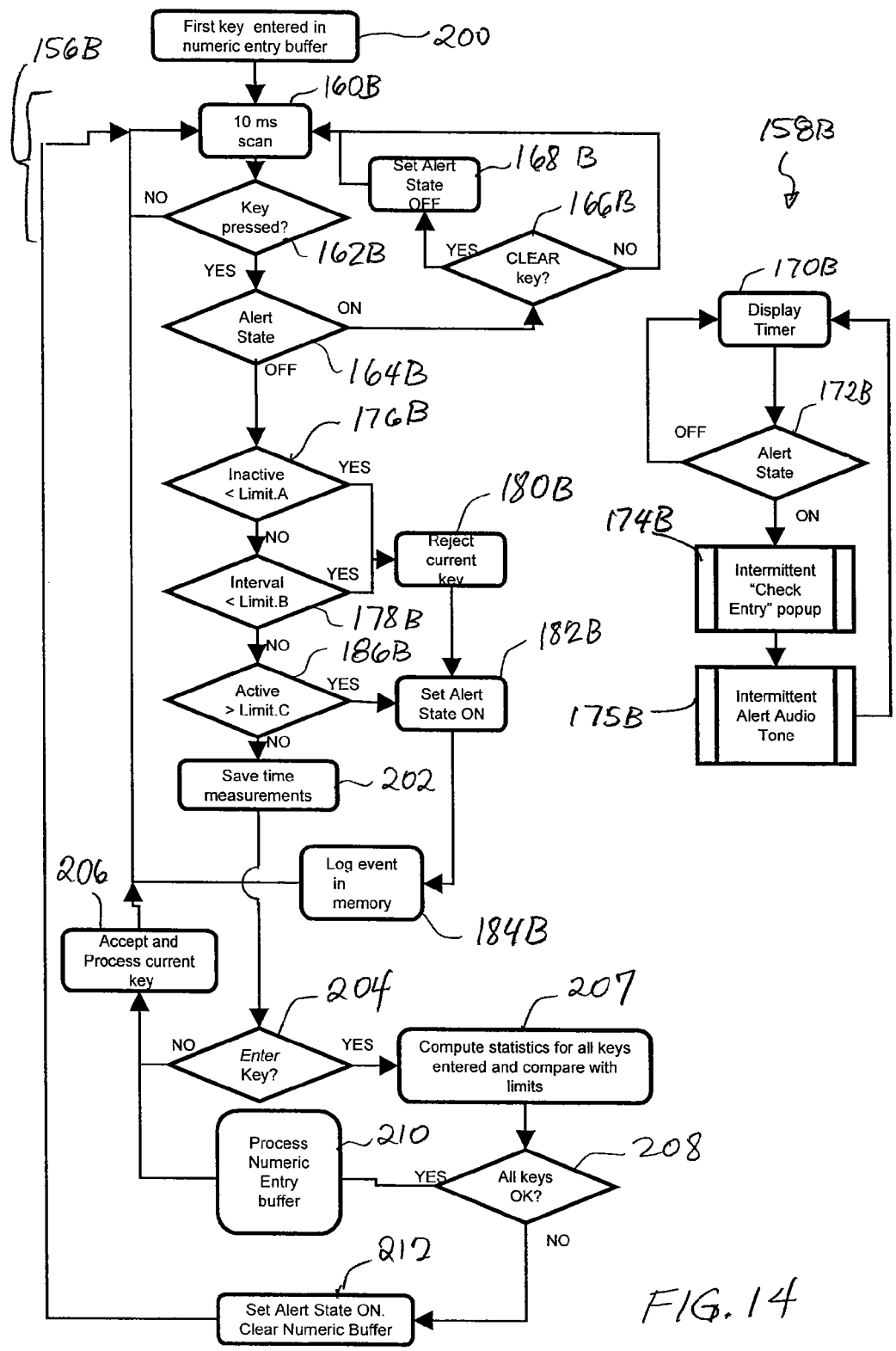
FIG. 14 is a flow chart of an alternate adaptive, operator-specific, method for preventing keyboard errors in accordance with aspects of the invention in which the timing of operator key presses is saved, statistics of the saved information are generated, and time limits are modified based on the statistics.

After determining 164 that the alert state is OFF, the method determines 176 if the actual inactive length of time is shorter than inactive length of time limit (designated "Limit.A" in FIGS. 12-14). If the actual inactive time is not shorter than the inactive time limit, the method proceeds to determine 178 whether if the actual interval time or actual key press-to-press time is shorter than a key press-to-press time limit (designated "Limit.B" in FIGS. 12-14). When either the inactive time limit or press-to-press limit is violated, the method rejects the key press 180, sets the alert state to ON 182, logs or stores the event in a memory 184, and resumes the ten-millisecond scan of keys 160. In the case of a numerical key press, rejecting the key press 180 preferably includes preventing a corresponding number from being shown on the display.

When both the inactive time limit and the press-to-press limit are not violated, the method determines 186 whether the actual key active time is longer than an active time limit (designated "Limit.C" in FIGS. 12-14). When the active time limit is violated, the method sets the alert state to ON 183, the logs the event in a memory 185, accepts and processes the key press 188, and resumes the ten-millisecond scan of keys 160. In the case of a numerical key press, a numeral corresponding to the key that was pressed is shown on the display in one embodiment. Logging the event 184, 185 may include storing data representing the identification of the operator making the entry, actual inactive time, actual press-to-press time, and actual key active time, and other data relevant to the key press. The memory in which data is stored may, though not necessarily, be located within a medical device, such as an infusion pump.

When the inactive limit, press-to-press limit, and active limit are not violated, the method saves 187 time period measurements, processes the current key press 188, and resumes the ten-millisecond scan of keys 160. The saved time period measurements include the actual inactive time, actual press-to-press time, and actual key active time. The measurements may be saved in a memory located within a medical device, such as an infusion pump.

Referring now to FIG. 13, a flow chart of an alternate embodiment of a key press method in accordance with aspects of the invention is provided. The method applies keying characteristics of a user or operator who is making entries on a key pad. The method includes a key scan loop 156A and a display scan loop 158A that are identical to that shown in FIG. 12. The key scan loop 156A and the display scan loop 158A run concurrently. Preceding the key scan 160A, the method sets initial time limits for the current user 190. Setting the initial time limits 190 may include identifying the current user from an identification code entered by the user or read from an identification card provided by the user. In this embodiment, the initial time limits include an initial key press-to-press limit, an initial inactive time limit, and an initial active time limit. The initial time limits may be stored in and retrieved from a memory located within a medical device, such as an infusion pump.

After scanning keys 160A, the method of FIG. 13 proceeds in manner similar to the method of FIG. 12, except that the method of FIG. 13 updates 192 the time limits (the inactive limit, key press-to-press limit, and active time limit) when none of the time limits are determined 176A, 178A, 186A to have been violated. In this way, a subsequent key press will be checked against the updated time limits. Preferably, the updated time limits are also stored in the memory so that the updated time limits are used in setting the initial time limits 190 when the same user makes use of the medical device at a later time. After updating the time limits, the method accepts and processes the key press 188A, and resumes the ten-millisecond scan of keys 160A.

It is to be understood that as the user makes new key presses the time limits are adapted or adjusted as a function of the new key presses. For example, after measuring twenty key presses all of which were accepted, a new average active time could be obtained. The new average active time could be derived from a current average of a previous active time average together with actual active times of the twenty most recent accepted key presses. An updated active time limit could be taken to be a proportion of the current average by multiplying the current average multiplied by a predetermined factor.

Referring next to FIG. 14, a flow chart of an alternate embodiment of a key press method in accordance with aspects of the invention is provided. The method applies adaptive statistical analysis of all keys currently in a numeric buffer. The method includes a key scan loop 156B and a display scan loop 158B that are identical to those shown in FIGS. 12 and 13. The key scan loop and the display scan loop run concurrently. As part of the key scan loop, the method stores a first key entered or pressed in a numeric entry buffer 200. In one embodiment, the buffer is a memory device located in a medical device. The method proceeds by scanning a plurality of keys on a keypad every ten milliseconds 160B in this embodiment. If a key press is not detected 162B, the method returns to scanning all keys 160B. If a key press is detected, the method determines whether the alert state is ON or OFF 164B. When the alert state is ON, the method determines whether the CLEAR key is pressed 166B. The alert state is set to OFF 168B when the CLEAR key is pressed. If the CLEAR key is not pressed 166, the ten-millisecond scan of keys 160B resumes.

After determining 164B that the alert state is OFF, the method determines 176B if the actual inactive length of time is shorter than inactive length of time limit (designated "Limit.A" in FIG. 14). If the actual inactive time is not shorter than the inactive time limit, the method proceeds to determine 178B whether if the actual interval time or actual key press-to-press time is shorter than a key press-to-press time limit (designated "Limit.B" in FIG. 14). When either the inactive time limit or press-to-press limit is violated, the method rejects the key press 180B, sets the alert state to ON 182B, logs or stores the event in a memory 184B, and resumes the ten-millisecond scan of keys 160B. In the case of a numerical key press, rejecting the key press 180B preferably includes preventing a corresponding number from being shown on the display.

When both the inactive time limit and the press-to-press limit are not violated, the method determines 186B whether the actual key active time is longer than an active time limit (designated "Limit.C" in FIG. 14). When the active time limit is violated, the method sets the alert state to ON 182B, the logs the event 184B in the memory, and resumes the ten-millisecond scan of keys 160B. In the case of a numerical key press, a numeral corresponding to the key that was pressed is shown on the display in one embodiment. Logging the event 184B may include storing data representing the identification of the operator making the entry and other data relevant to the key press.

When the inactive limit, press-to-press limit, and active limit are not violated, the method saves 202 time measurements and determines whether the key that was pressed was an ENTER key 204. The saved time measurements include the actual inactive time, actual press-to-press time, and actual key active time. If the ENTER key was not pressed, the method accepts and processes the current key press 206 and resumes the ten-millisecond scan of keys 160B.

If the ENTER key was pressed, the method computes statistics for all keys entered and compares the statistics with limits 207. An example of a computed statistic is an average inactive time. The method then determines 208 whether all keys pressed are OK. As an example of determining whether a key press is "OK," the process compares individual inactive times to an average. If any individual is less than a predetermined percentage of the average, then that NUMBER (that is, all the keys in the buffer) are to be rejected. The numerical entry typically includes a sequence of numerical key presses occurring prior to the pressing of the ENTER key. If all key presses are determined to be OK, the method processes the numeric entry buffer 210 and accepts and processes the current key press 206. Processing of the numeric entry buffer may include setting an operating parameter of the medical device in accordance with the contents of the numeric entry buffer. Alternatively, if all key presses are not OK, the method sets the alert state to ON and clears the numeric entry buffer 212, and resumes the key scan loop 156B.

While several particular forms of the invention have been illustrated and described, it will also be apparent that various modifications can be made without departing from the scope of the invention. It is also contemplated that various combinations or sub-combinations of the specific features and aspects of the disclosed embodiments can be combined with or substituted for one another in order to form varying modes of the invention. Accordingly, it is not intended that the invention be limited, except as by the appended claims.

What is claimed is:

1. A method for preventing keypad entry errors, the method comprising the steps of:
    detecting a press and a release of a first key of a keypad having a plurality of keys, the time between the press and the release of the first key being an actual first key active time;
    detecting a press and a release of a first subsequent key on the keypad, the time between the press and the release of the first subsequent key being an actual first subsequent key active time;
    determining an actual key press-to-press length of time between the press of the first key and the press of the first subsequent key;
    determining an actual inactive length of time between the release of the first key and the press of the first subsequent key;
    accepting the first key press only if the actual first key active time equals or exceeds a predetermined minimum on-time and the release of the first key precedes the press of the first subsequent key; and
    accepting the first subsequent key press only if the actual inactive length of time equals or exceeds a predetermined minimum off-time, the actual key press-to-press length of time equals or exceeds a predetermined value, and the actual first subsequent key active time equals or exceeds the minimum on-time.

2. The method for preventing keypad entry errors of claim 1, further comprising the step of:
    providing an active time alert if the actual first key active time exceeds an active time limit.

3. The method for preventing keypad entry errors of claim 2, further comprising recognizing the first key press regardless of the active time alert being provided.

4. The method for preventing keypad entry errors of claim 1, further comprising the step of:
    providing press-to-press time alert if the first subsequent key press has been rejected due to the actual key press-to-press time being shorter than the predetermined value.

5. The method for preventing keypad entry errors of claim 4, wherein the press-to-press time alert comprises a visual display prompting an operator making an entry on the keypad to verify the entry.

6. The method for preventing keypad entry errors of claim 4, wherein the press-to-press time alert comprises an audible warning of first subsequent key press rejection.

7. The method for preventing keypad entry errors of claim 4, further comprising the step of:
    ignoring further key presses after the press-to-press time alert has been provided until a specified key has been pressed.

8. The method for preventing keypad entry errors of claim 1, further comprising the step of:
    providing an alert if the first subsequent key press has been rejected due to the actual inactive length of time being shorter than minimum off-time.

9. The method for preventing keypad entry errors of claim 8, wherein the alert comprises a visual display prompting an operator making an entry on the keypad to verify the entry.

10. The method for preventing keypad entry errors of claim 8, wherein the alert comprises an audible warning of first subsequent key press rejection.

11. The method for preventing keypad entry errors of claim 8, further comprising the step of:
ignoring further key presses after the alert has been provided until a specified key has been pressed.

12. The method for preventing keypad entry errors of claim 2, further comprising the step of:
providing a first subsequent key active time alert if the actual first subsequent key active time exceeds the active time limit.

13. The method for preventing keypad entry errors of claim 1, further comprising the steps of:
determining if the key used to produce a key press is a selected type of key; and
if the type of key being pressed is the selected type, ignoring at least one of the minimum on-time, the minimum off-time, and the predetermined value and not rejecting the key press.

14. The method for preventing keypad entry errors of claim 13, wherein the selected type of key is a navigation key.

15. The method for preventing keypad entry errors of claim 1, further comprising the steps of:
monitoring a plurality of key presses of the keypad;
comparing the monitored key presses to at least one of the time limits minimum on-time, the minimum off-time, and the predetermined value; and
modifying the at least one of the minimum on-time, the minimum off-time, and the predetermined value to which the monitored key presses were compared based on results of the comparison.

16. A method for preventing keypad entry errors, the method comprising the steps of:
detecting a press and a release of a first key of a keypad having a plurality of keys, the time between the press and the release of the first key being an actual first key active time;
providing a first key active time alert if the actual first key active time exceeds an active time limit;
detecting a press and a release of a first subsequent key on the keypad, the time between the press and the release of the first subsequent key being an actual first subsequent key active time;
determining an actual key press-to-press length of time between the press of the first key and the press of the first subsequent key;
providing a key press-to-press alert and rejecting the first subsequent key press if the actual key press-to-press time is shorter than a key press-to-press time limit;
determining an actual inactive length of time between the release of the first key and the press of the first subsequent key; and
providing an inactive length of time alert and rejecting the first subsequent key press if the actual inactive length of time is shorter than an inactive length of time limit; and
providing a first subsequent key active time alert if the actual first subsequent key active time exceeds the active time limit.

17. The method for preventing keypad entry errors of claim 16, wherein the step of providing a first key active time alert comprises recognizing the first key press regardless of the alert being provided.

18. The method for preventing keypad entry errors of claim 16, wherein the step of providing a first subsequent key active time alert comprises recognizing the first subsequent key press regardless of the alert being provided.

19. The method for preventing keypad entry errors of claim 16, wherein the step of providing a key press-to-press alert comprises providing a visual display warning.

20. The method for preventing keypad entry errors of claim 19, wherein the key press-to-press alert comprises an audible warning.

21. The method for preventing keypad entry errors of claim 16, further comprising the step of ignoring further key presses after the key press-to-press alert has been provided until a specified key has been pressed.

22. The method for preventing keypad entry errors of claim 16, further comprising the step of ignoring further key presses after the inactive length of time alert has been provided until a specified key has been pressed.

23. The method for preventing keypad entry errors of claim 16, further comprising the steps of:
determining if the key used to produce a key press is a selected type of key; and
if the type of key being pressed is a selected type, at least one of the active time limit, the key press-to-press time limit, and the inactive length of time limit is ignored and the key press is not rejected.

24. The method for preventing keypad entry errors of claim 23, wherein the selected type of key is a navigation key.

25. The method for preventing keypad entry errors of claim 16, further comprising the steps of:
monitoring a plurality of key presses of the keypad; and
comparing the monitored key presses to at least one of the active time limit, key press-to-press time limit, and inactive length of time limit; and
modifying the at least one time limit to which the monitored key presses were compared based on results of the comparison.

26. A system for preventing keypad entry errors, the system comprising:
a keypad having a plurality of keys;
a scanning device communicating with the keypad and configured to detect a time of a press of a first key on the keypad, a time of a release of the first key, a time of a press of a first subsequent key on the keypad, and a time of a release of the first subsequent key;
a memory configured to store a key press-to-press limit, a key inactive limit, and a key active limit; and
a processor in communication with the scanning device and the memory, the processor programmed to:
determine an actual key press-to-press length of time between the press of the first key and the press of the first subsequent key;
retrieve the key press-to-press limit from the memory;
reject the first subsequent key press if the actual key press-to-press time is shorter than the key press-to-press limit;
determine an actual key inactive time between the release of the first key and the press of the first subsequent key;
retrieve the key inactive limit from the memory;
reject the first subsequent key press if the actual key inactive time is shorter than the key inactive limit;
determine an actual key active time between the press of the first key and the release of the first key;
retrieve the key active limit from the memory; and
provide an alert if the actual key active time is longer than the key active limit.

27. The system for preventing keypad entry errors of claim 26, wherein the processor is further programmed to:

recognize the first key press regardless of the active time alert being provided.

28. The system for preventing keypad entry errors of claim 26, wherein the processor is further programmed to:
provide an alert if the first subsequent key press has been rejected due to the actual key press-to-press time being shorter than the key press-to-press time limit.

29. The system for preventing keypad entry errors of claim 26, wherein:
the system further comprises a display device; and
the processor is further configured to provide a visual display warning on the display device if the first subsequent key press has been rejected.

30. The system for preventing keypad entry errors of claim 26, wherein:
the system further comprises an audio output device; and
the processor is further configured to provide an audio warning on the audio output device if the first subsequent key press has been rejected.

31. The system for preventing keypad entry errors of claim 26, wherein the processor is further programmed to:
ignore further key presses until a specified key has been pressed if either the actual key press-to-press time is shorter than the key press-to-press limit or the actual key inactive time is shorter than the key inactive limit.

32. The system for preventing keypad entry errors of claim 26, wherein the processor is further programmed to:
determine an actual first subsequent key active time between the press of the first subsequent key and the release of the first subsequent key; and
provide an alert if the actual first subsequent key active time is longer than the key active limit.

33. The system for preventing keypad entry errors of claim 26, wherein the processor is further programmed to:
determine if the key used to produce a key press is a selected type of key;
if the type of key being pressed is the selected type, the processor ignores one or more of the key press-to-press limit, the key inactive limit, and the key active limit and the key press is not rejected.

34. The system for preventing keypad entry errors of claim 33, wherein the selected type of key is a navigation key.

35. The system for preventing keypad entry errors of claim 26, wherein the processor is further configured to:
monitor a plurality of key presses of the keypad;
compare the monitored key presses to at least one of the key press-to-press limit, the key inactive limit, and the key active limit; and
modify the at least one of the key press-to-press limit, the key inactive limit, and the key active limit to which the monitored key presses were compared based on results of the comparison.

* * * * *